Aug. 16, 1938.   A. T. NABSTEDT   2,127,305
BRAKE FOR USE WITH POWER TRANSMITTING MECHANISM
Filed Oct. 5, 1935   2 Sheets-Sheet 2
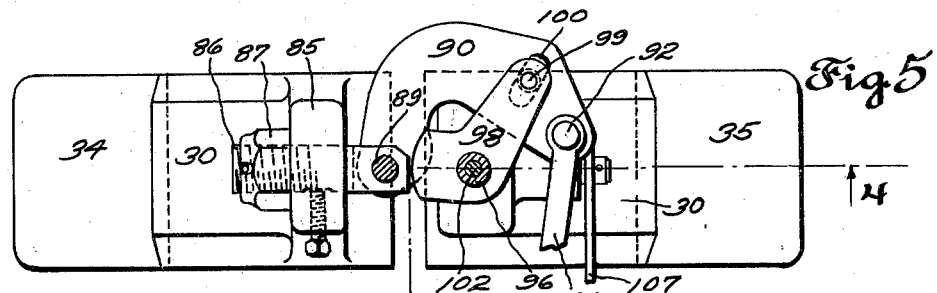
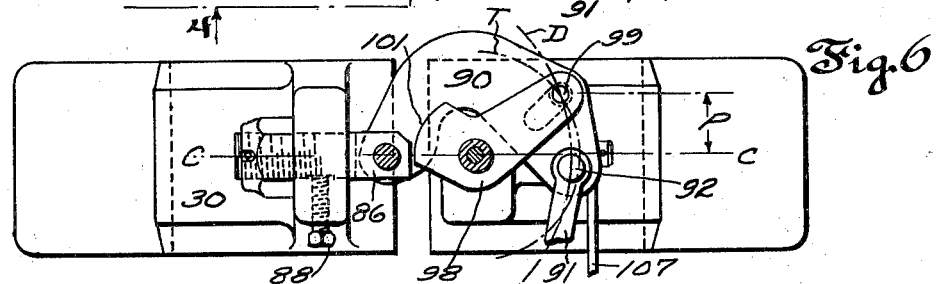
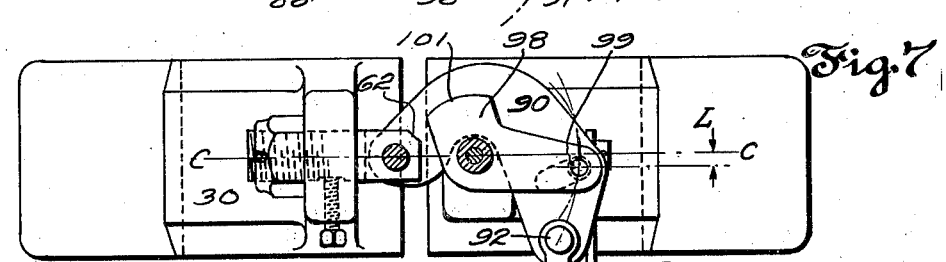
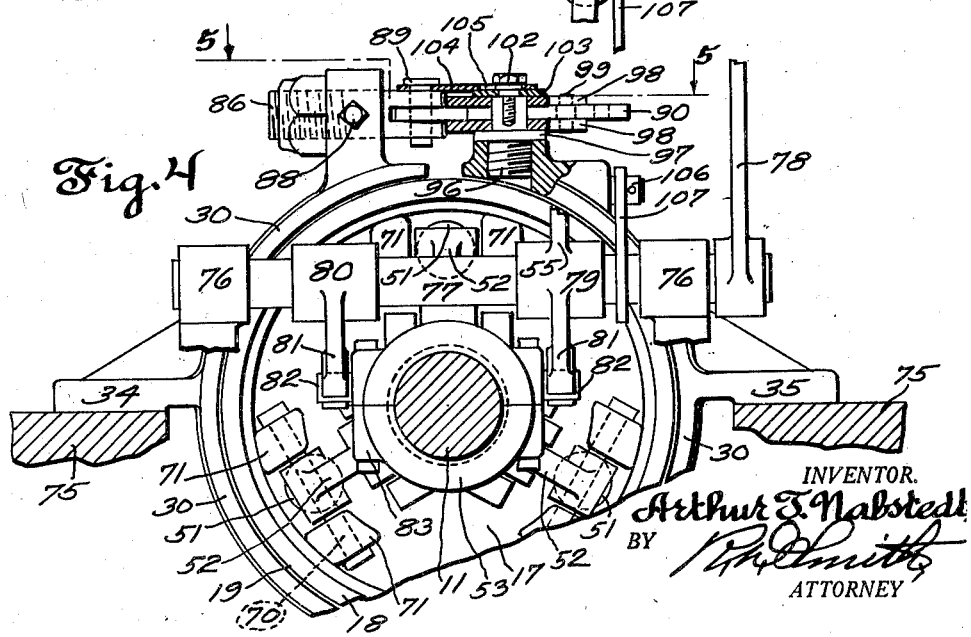
INVENTOR.
Arthur T. Nabstedt
BY
ATTORNEY Patented Aug. 16, 1938

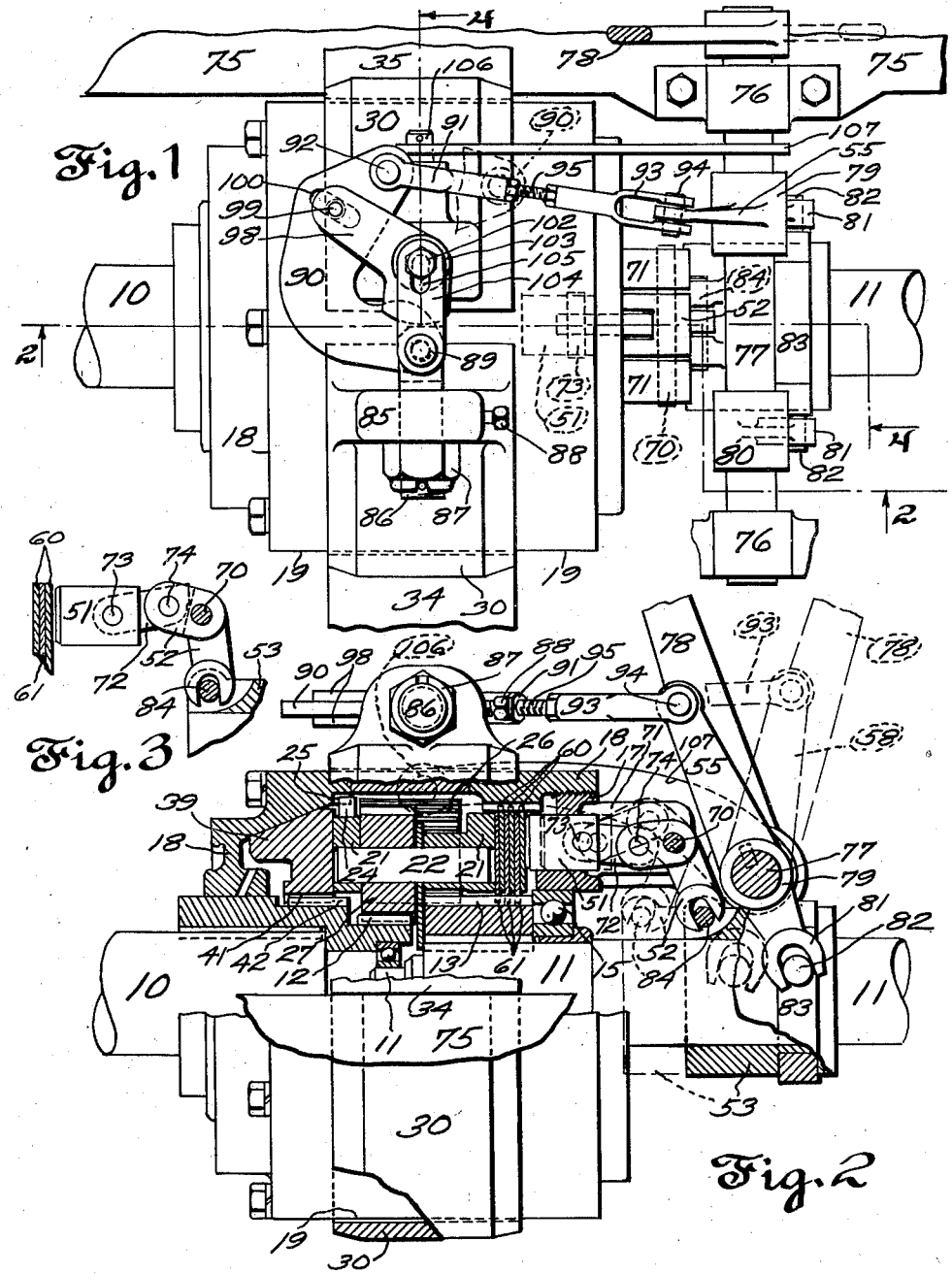

2,127,305

UNITED STATES PATENT OFFICE 2,127,305

BRAKE FOR USE WITH POWER TRANSMITTING MECHANISM

Arthur T. Nabstedt, Hamden, Conn., assignor to The Snow & Petrelli Mfg. Co., New Haven, Conn., a corporation of Connecticut Application October 5, 1935, Serial No. 43,660

20 Claims. (Cl. 188—77)

This invention relates to mechanism for manually operating and controlling the performance of a brake element or elements thereby to arrest a rotor or release the same for free rotative movement. In some of its features, the invention relates to novel mechanical movement in mechanism for expanding and contracting a split ring type of brake band surrounding a rotatable drum; also to combinations thereof with the clutching and unclutching control parts of a power transmission unit of which the drum may form an operative part as in the case of a so called "reverse gear". A common use for the reverse gear is to transmit power in selectively reversible directions from a marine engine to the shaft of a boat propeller. Mechanism typical of such reverse gear is disclosed in detail in United States patent, Number 1,918,775, granted July 18, 1933, to A. T. Nabstedt. The present improvements may be applied thereto and to other and different types of power transmission units, or may be used for braking purposes foreign to the function of power transmission.

The invention as embodied in brake band operating mechanism aims to provide a more forceful and more quickly and positively acting clamping of the band against the drum responsive to a given force exerted upon the operating handle than has heretofore been possible, thereby requiring less strength to be exerted by the hand of the operator.

Related objects are to produce a quicker and more dependable drum releasing action of the brake band when the operating handle is reversely moved, and to insure that the band shall be positively retained in either of its fully braked and fully released positions until purposely shifted therefrom by movement of the operating handle.

A further object is to provide a mechanical movement novel to brake band operating mechanism whereby such mechanism shall respond to an operating throw of the handle in a manner to impart a sense of "feel" to the hand of the operator, immediately and reliably informing him when the drum has become fully clamped by the brake band.

For attainment of the above and related objects, the present improvements contemplate for operating a brake band a linkage of freely pivoted toggle acting or overcentering parts eliminating thereby much frictional resistance and other retardant forces which have burdened the manual operation of older types of brake band operating mechanisms such as the cam and follower type illustrated in the United States patent referred to above. The pivotal relationship of the parts permits the brake band freely to accommodate itself to the surface of the rotor being braked and thereby evenly distribute the application of its frictional force throughout the width of the band.

In order to be suited to available space and to the standardized relationship of a reverse gear to its power and propeller shafts and to the control handle thereof, a further object of these improvements is to arrange such pivoted toggle acting parts for swinging movement in planes parallel to one another and tangentially related to the circle of the brake band.

The improvements further provide means acting positively to complete the expanding movement of the band to its fully open position and to lock it in such position so that no drag or failure of the band completely to release the drum can be caused by the fatigue of any spring or failure of spring action, or can otherwise occur.

The improvements further provide means positively limiting the expanding movement of the brake band, which again is of particular importance to the use of brake operating toggle mechanism in a reverse gear, because an indeterminate or unlimited ability of the brake band to expand under its natural opening tendency might otherwise re-act upon the clutch operating control lever of the reverse gear to which the band operating mechanism is coupled and partially or fully engage the clutch with consequent turning or dragging by the boat propeller.

Still further objects will become apparent from the following description and appended drawings, wherein:

Fig. 1 is a plan view of a reversing gear with brake and clutch operating mechanism illustrative of the present improvements and shows a portion of a boat frame on which the same may be mounted together with a cross section of the manual operating handle.

Fig. 2 is an elevational view of the mechanism of Fig. 1 taken partly in longitudinal section on the planes 2—2 in Fig. 1 looking in the direction of the arrows.

Fig. 3 is a fragmentary view of certain clutch operating parts shown in different positions than appearing in Fig. 2.

Fig. 4 is a view looking from the right at Fig. 1, certain parts being shown in section on the planes 4—4 in Fig. 1 and certain other parts being broken away or omitted better to reveal the parts which are shown.

Fig. 5 is a plan view of the brake band and its operating mechanism taken in section on the planes 5—5 in Fig. 4 and showing the operating mechanism in one extreme of its brake releasing position.

Fig. 6 is a view similar to Fig. 5 showing the brake operating mechanism advanced to a point where the brake will begin to be applied.

Fig. 7 is a view similar to Figs. 5 and 6 showing the brake operating mechanism at the extreme of its movement which applies the brake.

It will facilitate an understanding of the present improvements in brake and clutch operating mechanism to first and briefly describe an epicyclic gear mechanism of a type commonly employed in reversing gears used for transmitting power from a marine engine to a boat propeller. Fuller details of such mechanism and its mode of operation may be understood by reference to United States Patent No. 1,918,775, granted July 18, 1933, to A. T. Nabstedt. It will suffice here to explain that the power transmission or reversing gear may be jointly supported by the adjacent and axially aligned ends of a power shaft 10, which may be driven by a marine engine, and a driven shaft 11, which may rotate a boat propeller.

The function of the reversing gear is to rotatably connect shafts 10 and 11 for either forward or reverse operation of the propeller by the crank shaft of a marine engine while the shaft rotates in a constant direction. To this end, power shaft 10 which is supported in a bearing or bearings not shown in the drawings, is keyed to the sleeve gear 12; and propeller shaft 11, which is supported in a bearing or bearings not shown in the drawings, is keyed to the sleeve gear 13. A cylindrical casing 18 having a smooth exterior braking surface 19 on its periphery surrounds, and is rotatable with respect to, both sleeve gears 12 and 13 having, as shown in Fig. 2, a left end bearing on the hub of sleeve gear 12 and a right end bearing on the propeller shaft 11. This latter bearing in the construction here illustrated employs the rolling balls 15.

Also inside of the cylindrical casing or drum 18 is a pinion cage 21 which may carry one or more pinion studs 22 in separate sets spaced about the circle of rotation of the pinion cage. There may be two such studs in each set, one of which is shown in Fig. 2. One stud of each set may carry the pinion 27 meshing with the sleeve gear 12 and the other stud of the same set may carry a wider pinion 26 meshing both with pinion 27 and with the sleeve gear 13. Pinions 26 and 27 when active, result in the rotation of power shaft 10 in one direction driving the propeller shaft 11 in an opposite rotational direction when the drum 18 is held from rotating, because the pinion cage 21 while free to have a limited sliding movement longitudinally of drum 18, is nevertheless maintained in fixed rotative relation to drum 18 by peripherally carried lugs 24 which engage with and are free for axial movement in drum carried grooves 25. Means for holding the drum from rotation include its surrounding brake band 30 whose manner of operation is later to be described.

When drum 18 is free to rotate, transmission of power from the shaft 10 to shaft 11 depends upon whether certain clutch parts are engaged or released. These clutch parts in the form shown are of two kinds at respectively different points in the reversing gear. One clutch part consists in the ring 39 at the left end of the reversing gear whose tapered peripheral face cooperates with a similarly inclined interior surface of the drum 18 to form a frictional clutch of the conical type, clutch ring 39 being axially slideable with relation to sleeve gear 12 and maintained in fixed rotative relation thereto by the engagement of internal teeth 41 on clutch ring 39 with corresponding external teeth 42 on the hub of sleeve gear 12.

The other clutch part consists in a series of clutch discs of which the alternate discs 60 have teeth on their outer circumference engaging corresponding teeth carried on the inner cylindrical surface of the drum 18, and of which series of discs the alternate discs 61 have teeth projecting radially inwardly from their inner circumference and engaging the teeth of sleeve gear 13. The entire series of discs 60 and 61 is therefore free to slide axially to perform a clutching and unclutching action between the drum 18 and the sleeve gear 13. Obviously, clutching must take place between the ring 39 and drum 18 at the same time that clutching takes place between the sleeve gear 13 and drum 18 in order to enable power shaft 10 to drive propeller shaft 11 when the drum 18 is free to rotate. This simultaneous clutching and unclutching by means of the clutch ring 39 and by means of the clutch discs 60 and 61 is determined by the thrust exerting and releasing movements of one or more plungers 51, of which three in equally spaced relation about the circle, are shown in Fig. 4. Each plunger 51 is slideably mounted in the right end plate 17 of the drum 18 and is movable axially with respect thereto by means of a bell crank 52 pivoted at 70 between bearing brackets 71 projecting to the right from the end plate 17. A connecting link 72 is pivoted at 73 to the plunger 51 and is pivoted at 74 to the bell crank 52, performing therewith a toggle action, and preferably a slightly overcentering toggle action, operative to force plunger 51 toward the left thereby to thrust the discs 60 and 61 together and at the same time thrusting pinion cage 21 toward the left and thrusting the clutch ring 39 into clutching engagement with the drum 18. Thus conditioned, all parts located within or mounted upon the drum 18 together with this drum, itself, turn in unison with both shafts 10 and 11 and transmit a direct power drive from the engine to the propeller.

The present improvements are more particularly concerned with mechanism by which the brake band 30 is contracted and expanded for grasping and releasing the drum 18 to control its freedom to rotate. This actuation of the brake band must be cooperatively related to the clutching and unclutching control movements of the plungers 51 for the satisfactory operation of a reversing gear, and a mechanism illustrative of one possible embodiment of the improvements can now be described.

A portion of the frame of the boat, or other stationary support means proximate the power transmission, is indicated at 75, it being understood that a corresponding portion of the frame or support is present at the opposite side of the mechanism in Fig. 1 although not shown in the drawings. Bearing brackets 76 are carried by such frame or support in which is journaled control shaft 77 fixedly carrying the manual control lever or handle 78 which may extend to a convenient point for manipulation by the operator. Shaft 77 carries fixed thereto a hub 79 and a hub 80 spaced to lie at opposite sides of the propeller shaft and each of which hubs carries a downwardly extending forked arm 81 engaging a lateral stud 82 carried by collar 83 occupying a circular groove in the shift sleeve 53 which is free to rotate with respect to collar 83 and is axially slideable upon the propeller shaft 11. For accommodating each of bell cranks 52 the sleeve 53 is recessed and provided with a pivot pin 84 with which the lower forked end of the bell crank 52 engages so that axial sliding of sleeve 53 swings the bell crank 52 upon its pivot 70, all of which parts rotate about the axis of the power and propeller shafts when drum 18 rotates thereabout.

The hub 79 further carries an upwardly extending arm 55 for operating the brake contracting and expanding mechanism. In the example chosen for illustration the brake consists of a relatively thin ring of cast metal or other suitable material preferably, but not necessarily, possessing a resilient quality tending to cause the spaced upper ends thereof to separate for causing a sufficient looseness of the band about the drum 18 to release the latter for free rotation. The band at each side is provided with the laterally extending supports 34 and 35, each of which rests freely, if desired, on a stationary frame abutment 75 in a manner to support the band against gravity in substantially concentric relation to the periphery of drum 18.

The spaced upper ends of band 30 are connected by a linkage of pivotal parts co-acting in a novel manner to control the closing and separating movements of the brake band ends. One end of the brake band is provided with an upstanding boss 85 penetrated by a heavy stud 86 passing through a clearance hole in boss 85 and has threaded engagement with an adjustor nut 87. Stud 86 is adapted to be locked in its longitudinally adjusted position and rotative relation to boss 85 by a set screw 88 and nut 87 is rotatively locked on stud 86 by a removable cotter pin which penetrates the stud and projects into a notch cut in the head of the nut in well known manner as shown. The inner end of stud 86 is slotted and provided with a pivot pin 89 on which swings the bell crank 90 hereinafter referred to as the draw arm. A suitable flat indicated by broken lines in Fig. 7 may be provided on stud 86 for contact with the inner end of set screw 88 to determine a rotative position of this stud within the boss 85 that will correctly align the axis of pivot pin 89. At its free end the draw arm 90 is linked to the terminal of the brake operating arm 55 by means of a connector consisting of the yoke 91 pivotally connected to the draw arm at 92, the yoke 93 pivotally connected to the operating arm 55 at 94, and the threaded stud 95 adjustably connecting the two yokes for determining the overall length of the connector.

The other end of the brake band has threaded into it an upstanding stud 96 having the shoulder 97 above which stud 96 serves as a pivot for the bell crank 98 which will hereinafter be referred to as the thrust arm. The thrust arm 98 may consist of two parts alike, one above and one below the draw arm 90 and connected together at one end of the thrust arm by the thrust pin 99 which passes through an elongated slot 100 in the draw arm 90. The other end of the thrust arm 98 has a curved edge 101 for co-acting with the end of the heavy stud 86 at times for purposes hereinafter explained. Thrust arm 98 is retained on its pivotal stud 96 by a shoulder screw 102 surrounded by the spacer washer 103. As best shown in Figs. 1 and 4, a link 104 having the elongated slot 105 connects the pivot pin 89 in the heavy stud 86 with the shoulder screw 102 and is pivotally free on both said pin and screw, being retained by the head of each and is free for limited lengthwise sliding under the head of the latter. Stud 86 is given a camming chamfer at 62 for co-action with the edge 101 of arm 98.

Proximate the portion of the brake band end which carries the pivotal stud 96, this end of the brake band also fixedly carries a lateral stud 106 pivotally engaged by the free end of a brace bar 107 which at its other end is pivotally mounted upon the control shaft 77. A roller may be employed in place of or in conjunction with the thrust stud 99 and many other departures made from the actual construction and arrangement of parts here illustrated which have been chosen with no intent to limit the scope of the invention thereto.

The operation is as follows. In the illustrative use of the present improvements for the control of boat propulsion, the left end of Figs. 1 and 2 will be termed "forward" and the right end of these same figures will be termed "aft" to designate the position of the reverse gear unit as a whole with respect to the boat. The full line position of parts in Figs. 1, 2 and 5 is brought about by shifting the control handle 78 fully forward so that the condition of the various parts of the mechanism is as follows.

Forked arms 81 have thrust the sleeve 53 to its extreme aft position whereby bell crank 52 is positioned by stud 84 to thrust the plungers 51 forward against the clutch discs 60 and 61 which in turn thrust the pinion cage 21 against the clutch ring 39 which limits the thrust of the parts by engaging the clutch seat on drum 18. It is preferable that at this point the pivot 74 shall have dropped slightly below a straight line connecting the centers of pivots 70 and 73, which overcentering action affords an easily released holding of the clutch parts in their fully clutched condition. Thus the teeth 42 on sleeve gear 12 will rotate ring 39 in unison with the power shaft 10 which will also cause the drum 18 to rotate in unison therewith. The teeth on drum 18 will rotate clutch discs 60 which will rotate clutch discs 61 rotatively engaged with the teeth of sleeve gear 13 so that the propeller shaft 11 and the reversing gear as a unit all turn in unison with the power shaft 10. To permit this the brake band 30 is expanded by reason of the brake operating arm 55 acting through the yokes or shackles 93 and 91 to thrust the free end of draw arm 90 to its extreme forward position as shown in Figs. 1 and 5. In this position the stud 99 carried by the thrust arm 98 falls midway the slot 100 in the draw arm and the curved edge 101 of thrust arm 98 confronts the end of stud 86 to cause and maintain a maximum separation of the thrust arm pivot 96 from the draw arm pivot 89 to which extent of separation the spaced ends of the brake band are limited by the link 104 as shown in Figs. 1 and 4. The condition of parts above described causes the boat to be propelled at full speed ahead. While the camming chamfer 62 given to the corner of stud 86 insures the freedom of arm edge 101 to move to its position in Fig. 5 or 6 from its position in Fig. 7 and enables camming action at this point to positively force apart the brake band ends without dependence upon any spring action whatever, the relationship of this edge 101 to the end of stud 86 in Figs. 5 and 6 is seen to comprise a positive lock subject to no disengagement tendency by the chamfer 62.

When the control handle 78 is shifted in aft direction to a position intermediate its full line and broken line positions in Fig. 2, the sleeve 53 and its operated bell crank 52 will be shifted to a position intermediate the full line and broken line showing of these parts in Fig. 2 and the clutch operating plungers 51 will be slightly withdrawn from the discs 60 as shown in Fig. 3 while toggle links 52, 72 will have overcentered to their position in Fig. 3. This will release the forward pressure on the clutch parts of the reversing gear so that while the clutch ring 39 continues to rotate with the power shaft 10, the drum 18 will be released from the clutching drive of ring 39 and cease to transmit power to the propeller shaft 11. This intermediate or "neutral" position of the control handle 78 shifts the brake band operating parts to their positions shown in Fig. 6, wherein the curved edge 101 of thrust arm 98 is on the way to being removed from opposition to the end of stud 86 but still opposes it so that the band can not contract, and wherein the thrust stud 99 traveling in the arc T has been brought to the radially outer end of slot 100 in draw arm 90 which swings in the arc D. Thus the brake band 30 remains loose about the drum 18 so that the drum is free to idle or to be held stationary without in either case, by its own movement, conveying any movement from the shaft 10 to the shaft 11.

For causing reverse drive of the boat propeller, the control handle 78 is swung to its extreme aft position indicated by broken lines in Fig. 2, wherein the sleeve 53, bell crank 52 and other operating parts for plungers 51 are shown to have still farther retracted the plungers 51, thus continuing the unclutched condition of the discs 60 and 61 and of the ring 39 relative to the drum 18. Now, however, the brake band operating draw arm and thrust arm have been pulled to their positions shown in Fig. 7 and have acted, in a manner to be described, to contract the brake band against the drum 18 and stop the drum from rotating. Pinion cage 21 will be held from rotating and reverse drive will be transmitted from sleeve gear 12 to sleeve gear 13 through the reversing pinions 27 and 26 turning upon their now stationary bearing studs 22.

Referring particularly to Figs. 6 and 7, the thrust stud 99 is seen to have traveled with the thrust arm 98 along the arc T from a point at the distance P from a center line C—C through the pivots 89 and 96 to a point at the distance L from said center line and on the opposite side thereof. Thereby through the pulling action of draw arm 90 and through the thrusting action of thrust arm 98 respectively on the pivots 89 and 96, the free ends of the brake band are forced together a distance represented by the separation of arcs T and D where these arcs are intersected by the center line C—C. To permit this action the edge 101 of thrust arm 98 has swung to a position to clear the path of stud 86 and the lost motion between the screw 102 and the end of slot 105 in link 104 has cooperated to accommodate the brake applying action.

Features of the mechanical movement illustrated in Figs. 5, 6 and 7 which may be noted in connection with the stated objects of this invention are as follows: The toggle nature of the co-action between arms 90 and 98 provides a forceful multiplication of the power exerted upon shackle 91 manually, so that the pivots 89 and 96 are drawn together with great ease and positiveness to effect a very powerful and well equalized clamping of the entire working surface of the brake band against the friction surface of the drum 18. The brace bar 107 takes the thrust of the parts during this action and maintains a fixed position for the center line C—C. The fact that stud 99 moves to an over-centering position wherein it is arrested by the engagement of draw arm 90 with pivot 96, to the extent L indicated in Fig. 7, affords a self locking effect which requires reverse movement of draw arm 90 by manipulation of the control handle 78 for releasing the parts from their position shown in Fig. 7. This also imparts a sense of feel acting backwardly through the control handle 78 to inform the operator that the overcentering action has been completed because the maximum resistance is felt at the time stud 99 passes the center line C—C.

When the parts occupy their brake releasing position as in Fig. 5 or 6, the degree of separation of the free ends of the brake band is positively established, its minimum being limited by the co-action of edge 101 with stud 86 and its maximum being limited by the link 104. Thus spring action is in no part depended upon to insure full releasing of the drum 18 and the brake band is positively prevented from dragging at any point upon the drum in any circumstance.

The disposition of the moving parts whereby they swing in parallel planes tangential to the circle of the brake band achieves simplicity and compactness in addition to the mechanical advantages above described. Simple means affording readily accessible adjustment reside in the nut 87 and in the connector stud 95 so that directions may be simply given and easily followed for a successful installation or servicing of the reversing gear unit.

Having made plain the principles by which the foregoing advantages may be secured, the following claims are intended to cover not only the particular constructions herein chosen to illustrate the invention, but all equivalents thereof which it would be within a mechanic's skill to substitute therefor within the principles taught by this disclosure.

I claim:

1. In brake operating mechanism, in combination with a movable brake member, a pivot carried by said member, a second pivot in relation to which said member is arranged to be movable, a relatively short thrust arm mounted to swing about the member carried pivot, a relatively long draw arm mounted to swing about said second pivot and coupled to said thrust arm at a less radial distance from said second pivot than is the distance of separation of said two pivots plus the effective length of the thrust arm when the brake is released.

2. In brake operating mechanism, in combination with a movable brake member, a pivot in relation to which said member is movable, engaging elements carried in part by said member and in part by said pivot and arranged to perform an overcentering movement for actuating said member, and means movable by one of said elements to limit the approach of said member to said pivot.

3. In brake operating mechanism, in combination with a movable brake member, a pivot in relation to which said member is movable, engaging elements carried in part by said member and in part by said pivot and arranged to perform an overcentering movement for actuating said member, and means constantly effective to limit the extent of separation of said member from said pivot.

4. In brake operating mechanism, in combination with a movable brake member, a pivot in relation to which said member is movable, engaging elements carried in part by said member and in part by said pivot and arranged to perform an overcentering movement for actuating said member, and means to limit the approach of said member to said pivot and means to limit the extent of separation of said member from said pivot.

5. In brake band operating mechanism, in combination with the relatively movable ends of a split brake band, a pivot carried by one of said ends, a separate pivot carried by the other of said ends, engaging elements arranged to swing respectively on each of said pivots and so operating to perform an overcentering movement thereby to vary the spacing of one of said pivots from the other for actuating the ends of the brake band, and means movable by one of said elements to limit the approach of one of said pivots relative to the other pivot.

6. In brake band operating mechanism, in combination with the relatively movable ends of a split brake band, a pivot carried by one of said ends, a separate pivot carried by the other of said ends, engaging elements arranged to swing respectively on each of said pivots and so operating to perform an overcentering movement thereby to vary the spacing of one of said pivots from the other for actuating the ends of the brake band, and means constantly effective to limit the extent of separation of said two pivots.

7. In brake band operating mechanism, in combination with the relatively movable ends of a split brake band, a pivot carried by one of said ends, a separate pivot carried by the other of said ends, engaging elements arranged to swing respectively on each of said pivots and so operating to perform an overcentering movement thereby to vary the spacing of one of said pivots from the other for actuating the ends of the brake band, and means to limit the approach of one of said pivots to the other pivot and means to limit the extent of separation of said two pivots.

8. In brake band operating mechanism, in combination with the relatively movable ends of a split brake band, a pivot carried by one of said ends, a separate pivot carried by the other of said ends, and engaging elements arranged to swing respectively on each of said pivots and cooperating to perform an overcentering movement thereby to vary the spacing of one of said pivots from the other for actuating the ends of the brake band, said elements being arranged to swing in parallel planes disposed in tangential relation to the circle of the brake band.

9. In brake band operating mechanism, in combination with a rotor, a cooperative split brake band having both ends movable in circumferential relationship to said rotor, a floating pivot carried by one of said ends and movable therewith in circumferential relation to said rotor, a separate floating pivot carried by the other of said ends and movable therewith in circumferential relation to said rotor, and interengaging devices arranged to swing respectively on each of said pivots and cooperating to perform an overcentering movement from brake releasing position to brake applying position thereby to impel both of said pivots in circumferential relation to said rotor for decreasing the spacing of one of said pivots from the other and locking both ends of the brake band in brake applied position, together with detent means cooperative with said devices in a manner releasably and automatically to lock said devices in brake releasing position.

10. In brake operating mechanism, in combination with a movable brake member, a pivot carried by said member, a second pivot in relation to which said member is adapted to move, and two interengaged arms each mounted to swing about a different one of said pivots for actuating said member, one of said arms being arranged to swing into contact with one of said pivots for limiting movement of the arm.

11. In brake operating mechanism, in combination with a rotor, a brake band extending around said rotor and split to form separable ends both arranged to be movable in circumferential relation to said rotor, two toggle arms mounted to swing in planes approximately parallel to the axis of said rotor on respectively different and spaced pivots, said pivots being carried respectively by the said ends of the brake band and said arms being connected and arranged to perform an overcentering movement in a manner to simultaneously draw each of said band ends toward the other and then automatically hold said ends against separation.

12. In brake operating mechanism, the combination set forth in claim 11 together with engaging elements carried respectively by said arms and constructed and arranged to permit relative movement thereof and to move therewith from one side to the other side of a plane perpendicular to the said rotor axis and passing through the center of both of the said pivots.

13. In brake operating mechanism, the combination set forth in claim 11 together with slidably engaging elements carried respectively by said arms and constructed and arranged to move therewith from one side to the other side of a plane perpendicular to the said rotor axis, thereby automatically to lock said ends of the brake band in brake applied position and prevent unlocking thereof by the frictional drag of said rotor against said band or vibrations resulting therefrom.

14. In brake operating mechanism, in combination with a rotor, a cooperative flexible split brake band having separable ends free to move circumferentially with respect to said rotor, a pivot carried by each of said ends of the band in relation to which the other end of the band is movable circumferentially of said rotor, and two interconnected toggle arms each mounted to swing respectively on each of said pivots and arranged to over-center in one direction of movement in a manner to draw and hold together both ends of said band in braking position, together with means to permit excess movement of one of said arms in the reverse direction without causing corresponding movement of either of said band ends after the latter have been separated sufficiently to release the brake.

15. In brake operating mechanism, the combination defined in claim 9 in which the said devices and detent means are cooperatively arranged yieldingly to oppose movement of said devices both in the direction of their brake releasing position and in the direction of their brake applying position, thereby releasably to station said devices in a neutral position intermediate their other said positions, together with an operating handle connected to one of said devices in a manner to be held thereby in each of said brake applied, neutral and brake releasing positions.

16. In brake operating mechanism, in combination with a rotor and its support frame, a flexible split brake band arranged to cooperate with said rotor and carrying one or more stops circumferentially distant from the split in said band disposed to engage with said frame, a floating pivot carried by one end of said band near the split therein and free to move therewith circumferentially of said rotor, a second floating pivot carried by the other end of said band near the split therein and free to move therewith circumferentially of said rotor, inter-engaging toggle arms mounted to swing respectively on each of said pivots in planes approximately parallel to the axis of said rotor in a manner to draw and hold together both ends of said band, a brace bar connecting one of the said ends of the brake band to said frame in a manner to permit said free circumferential movement of the former, and means for manually exerting an actuating force upon one of said toggle arms in approximately the direction said brace bar extends.

17. In brake operating mechanism, in combination with a rotor, cooperative rotor braking means having different parts movable in circumferential relation to said rotor, a floating pivot carried by and movable with one of said parts in circumferential relation to said rotor, a second floating pivot carried by and movable with another of said parts in circumferential relation to said rotor, and two constantly engaged devices each mounted to swing while so engaged about a different one of said pivots for actuating said means, said devices including two bell cranks having their angles oppositely disposed and each mounted to swing about a different one of said pivots respectively and said devices further including pivotally engageable elements movable with said bell cranks to and from a straight line passing through the center of both of said pivots.

18. In brake operating mechanism, the combination defined in claim 17 in which one of said bell cranks has one of its arms disposed to be movable into and out of aligned relationship to the space between the said pivots.

19. In brake operating mechanism, in combination with a rotor, cooperative rotor braking means having different parts movable in circumferential relation to said rotor, a floating pivot carried by and movable with one of said parts in circumferential relation to said rotor, a second floating pivot carried by and movable with another of said parts in circumferential relation to said rotor, and two constantly engaged devices each mounted to swing while so engaged about a different one of said pivots for actuating said means, said devices including two bell cranks having their angles oppositely disposed, one of said bell cranks being mounted to swing about one of said pivots in straddling relation to the other of said pivots, and the other bell crank being mounted to swing about the last said pivot and having one of its arms movable to and from a position interposed between both of said pivots.

20. In brake operating mechanism, in combination with a rotor, cooperative rotor braking means having different parts movable in circumferential relation to said rotor, a floating pivot carried by and movable with one of said parts in circumferential relation to said rotor, a second floating pivot carried by and movable with another of said parts in circumferential relation to said rotor, and two constantly engaged devices each mounted to swing while so engaged about a different one of said pivots for actuating said means, said devices including two arms each mounted to swing about a different one of said pivots, one of said arms having an elongated slot and the other of said arms having a projection providing lost motion engagement with said slot, both said slot and projection being movable with said arms to and from a straight line passing through the center of both of said pivots.

ARTHUR T. NABSTEDT.